United States Patent [19]
Geebelen et al.

[11] Patent Number: 5,902,156
[45] Date of Patent: May 11, 1999

[54] METHOD FOR THE REALISATION OF ELECTRICAL CONNECTIONS, AS WELL AS A DISTRIBUTION DEVICE AND ELEMENTS USED HEREWITH

[76] Inventors: Jos Geebelen, Opitterstraat 26; Frans Camp, Hoogveldstraat 23, both of 3960 Bree, Belgium

[21] Appl. No.: 08/761,595

[22] Filed: Dec. 6, 1996

[30] Foreign Application Priority Data

Dec. 8, 1995 [BE] Belgium ............................... 09501016

[51] Int. Cl.$^6$ .................................................. H01R 9/22
[52] U.S. Cl. ........................... 439/714; 439/212; 439/177
[58] Field of Search .................................. 439/212, 213, 439/214, 712, 714, 721–724, 177, 576, 885

[56] References Cited

U.S. PATENT DOCUMENTS

| | | |
|---|---|---|
| 2,965,872 | 12/1960 | Linn . |
| 4,148,546 | 4/1979 | Wilson et al. . |
| 5,157,584 | 10/1992 | Rowe ................... 439/212 X |
| 5,160,274 | 11/1992 | Ozaki et al. ............ 439/724 |
| 5,490,794 | 2/1996 | Kobayashi et al. ....... 439/212 |

FOREIGN PATENT DOCUMENTS

| | | |
|---|---|---|
| 2 456 403 | 5/1980 | France . |
| U 17 61 670 | 2/1958 | Germany . |
| U 91 08 497 | 10/1991 | Germany . |
| 2 129 222 | 5/1984 | United Kingdom . |

*Primary Examiner*—Khiem Nguyen
*Attorney, Agent, or Firm*—Bacon & Thomas, PLLC

[57] ABSTRACT

A method for the realisation of electrical connections is set forth, characterized in that it consists in providing at least two conducting elements (1) which are provided with connection lips (2); removing a number of these connection lips (2) depending on the desired connections; applying the conducting elements (1), which are mutually electrically insulated, one above the other; and applying the remaining connection lips (2) to connectors (7) depending on the desired connections.

20 Claims, 6 Drawing Sheets

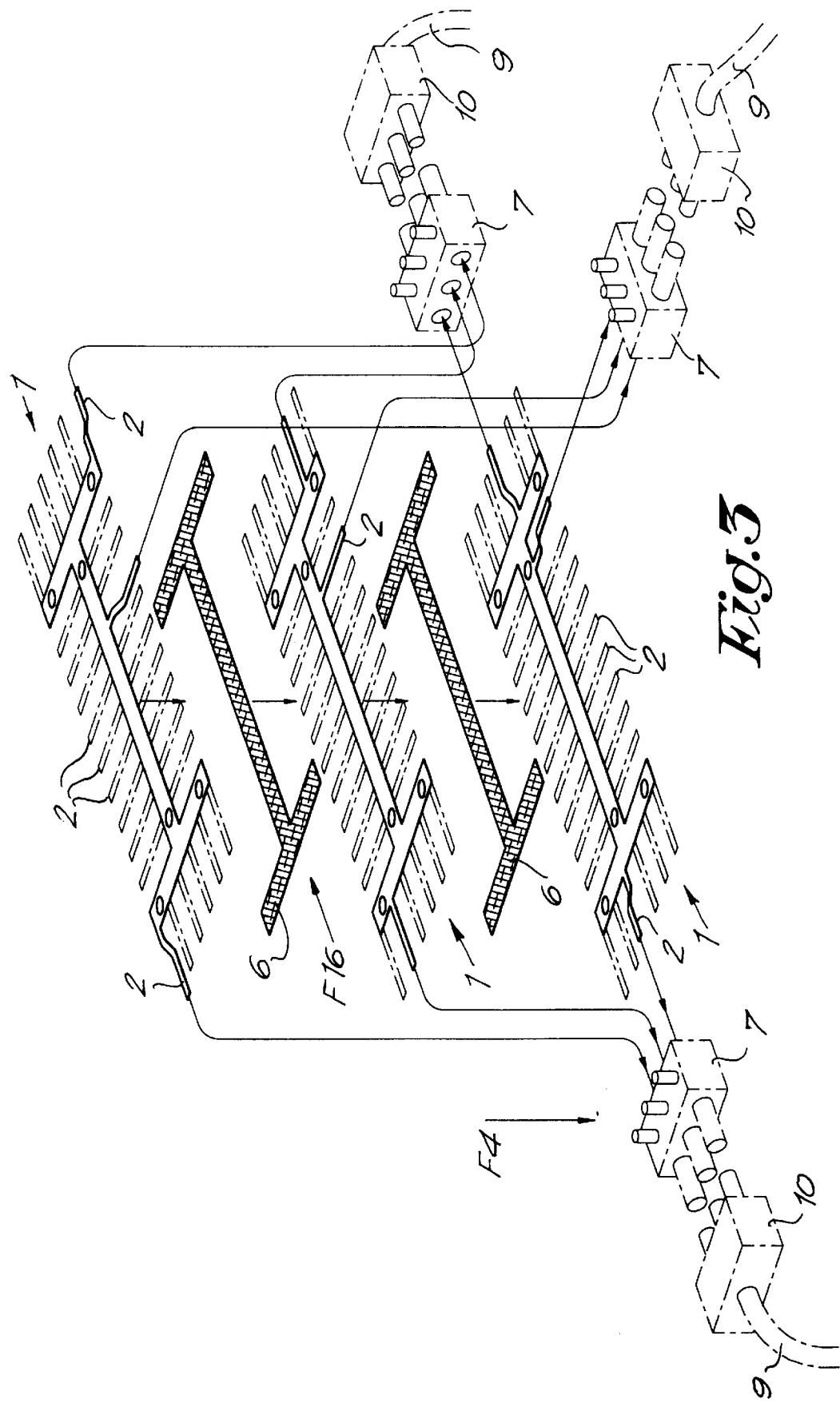

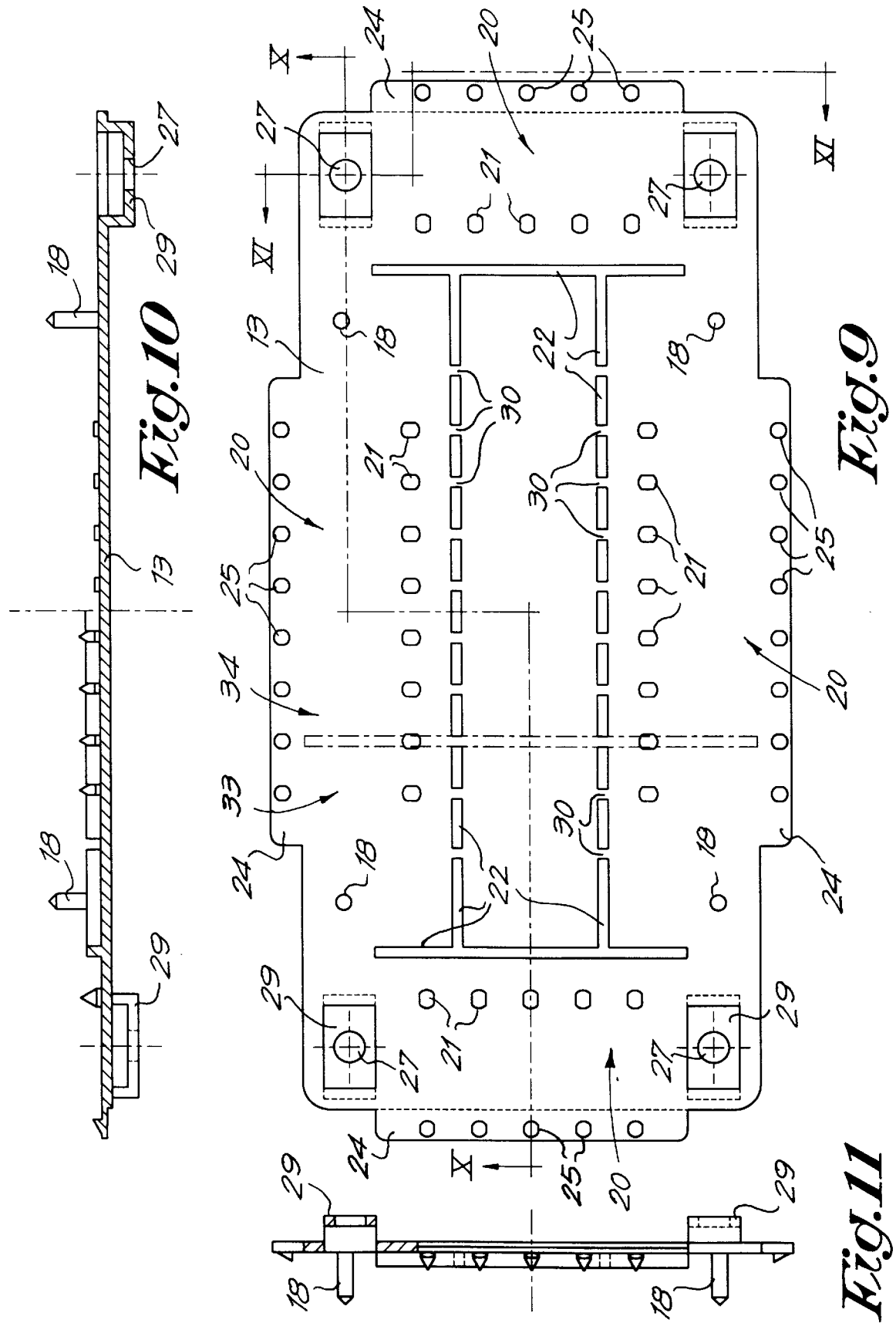

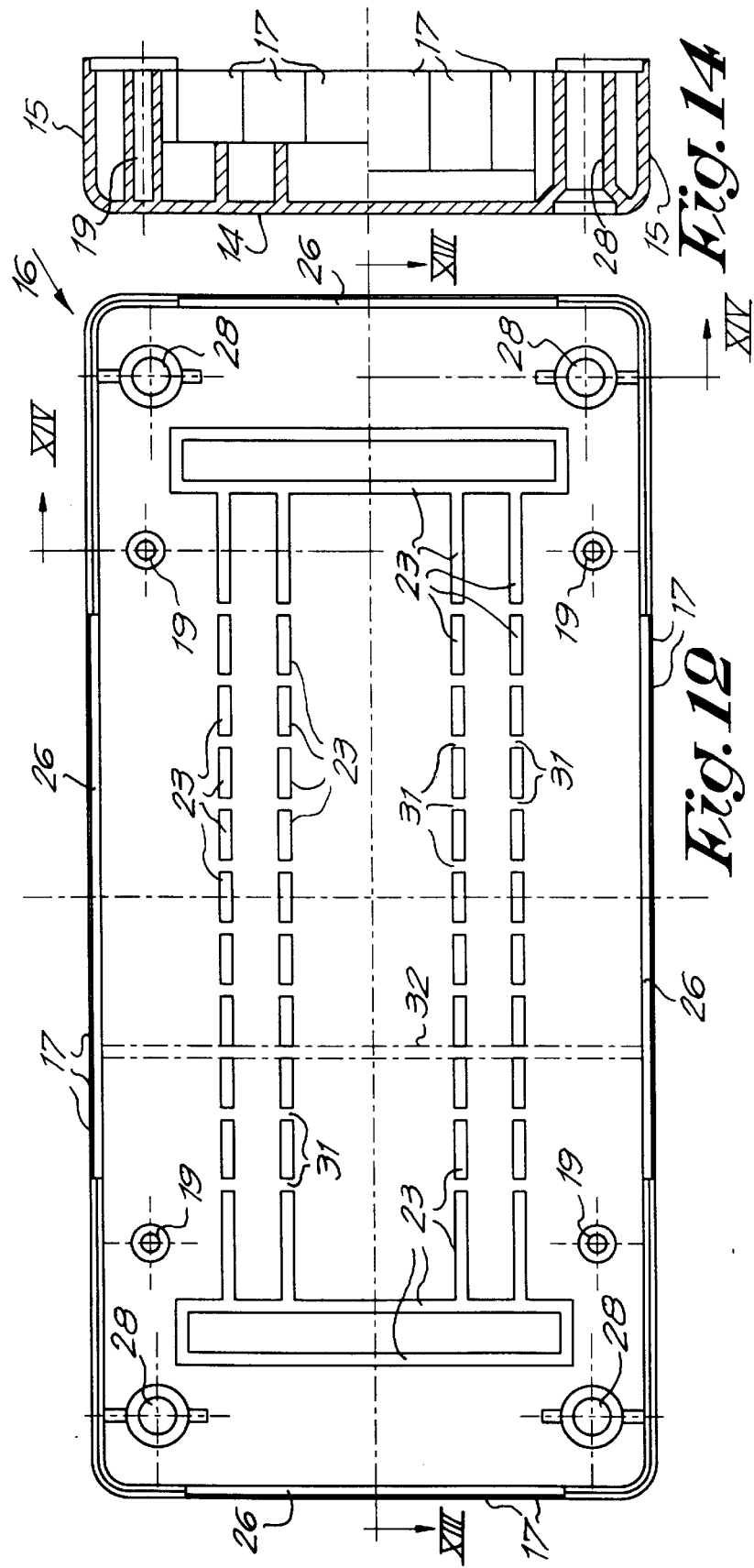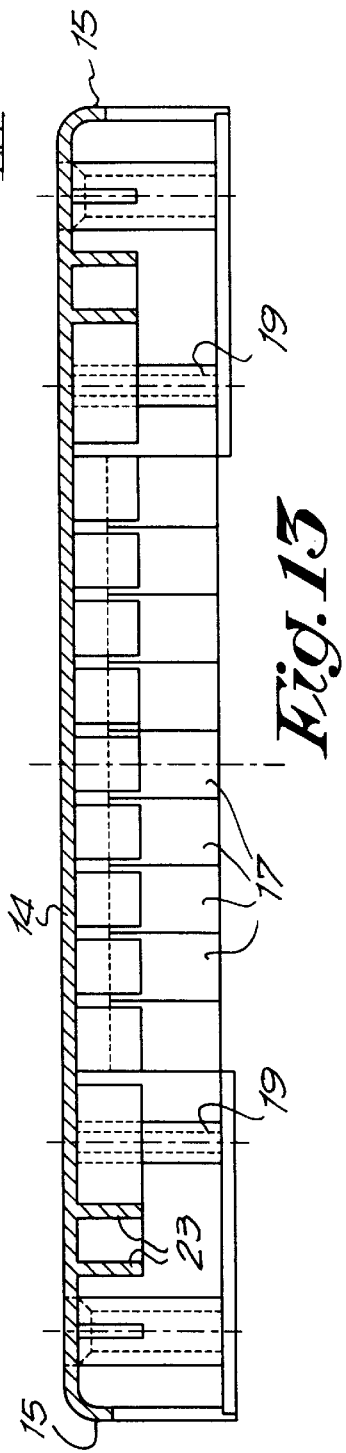

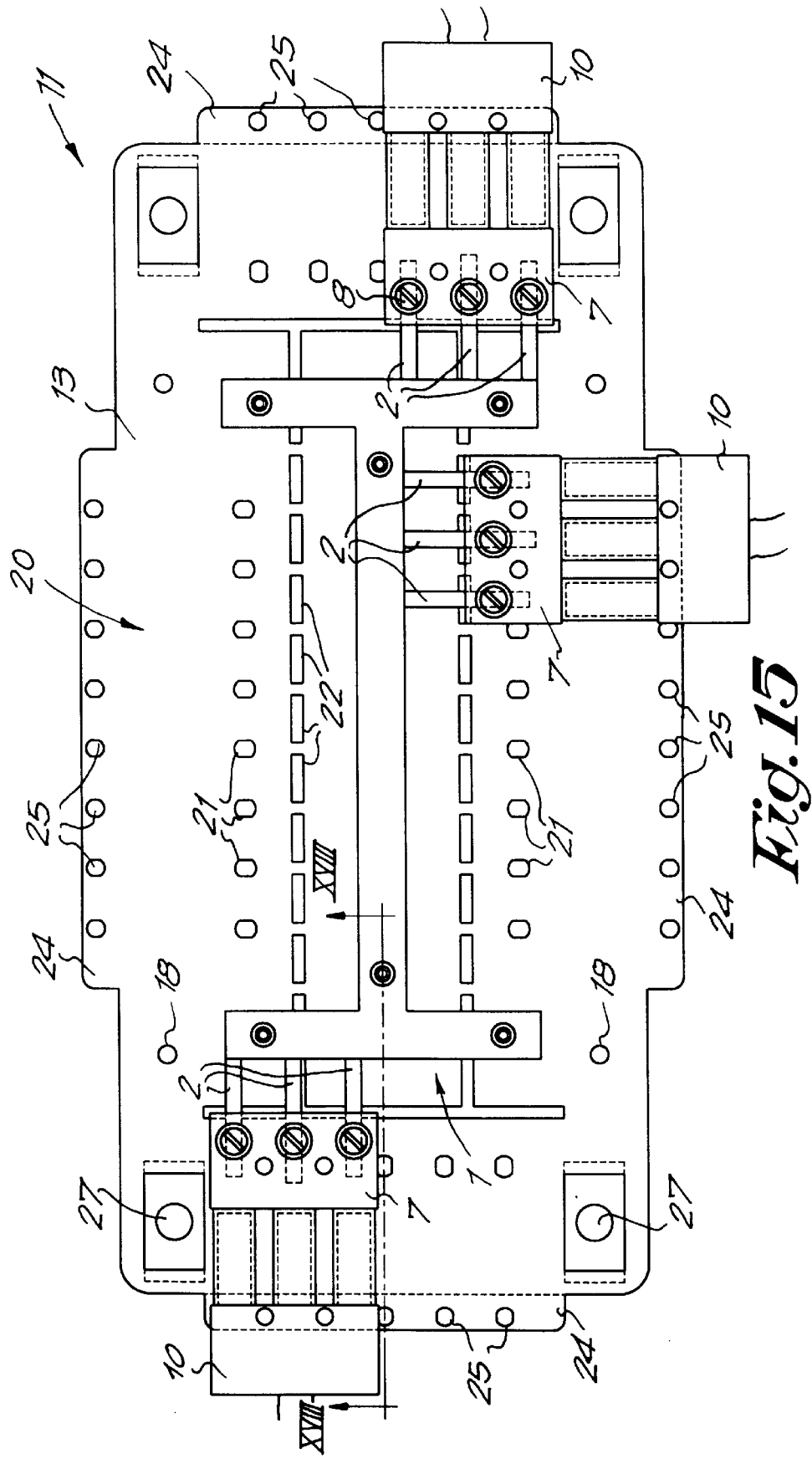

METHOD FOR THE REALISATION OF ELECTRICAL CONNECTIONS, AS WELL AS A DISTRIBUTION DEVICE AND ELEMENTS USED HEREWITH

FIELD OF THE INVENTION

The present invention concerns a method for making electrical connections, as well as a distribution device, more particularly a branch box, and elements used in making such connections.

The invention aims in the first place at making electrical connections in electrical feeding networks for lighting, power junctions and similar, but can in general be applied to electrical conducting networks of whatever nature, and also be used in telephone networks, broadcasting networks, video networks, monitoring networks, data networks, electrical networks for detection systems and/or alarm groups, and so on.

BACKGROUND OF THE INVENTION

It is known that electrical connections can be realized by joining the concerned electrical conductors in a branch box by means of wire connectors. According to another known technique the conductors are joined to each other by screwing them in clamps. These techniques offer the inconvenience that only a limited number of connections is possible because of the generally limited space which is available in similar branch boxes.

According to a more recent technique, use is made of electrical conductors which are joined to each other solely by using plugs and counterplugs. This technique, which offers the advantage that a wiring can be installed, which is quickly applied and easy to change, offers the inconvenience that still a cumbersome wiring in the branch boxes must be realized.

SUMMARY OF THE INVENTION

The invention aims at a method for the making of electrical connections, which enables the exclusion of the disadvantages of the past techniques.

To this end, this method consists in providing two or more preferably plate-shaped conducting elements which are provided with connection tips or lips; removing a number of these connection lips in accordance with the desired connections; applying the conductors one above the other to be mutually electrically insulated and applying connectors for connecting the wires on the remaining connection lips in accordance with the desired connections.

In this manner different connectors can be joined electrically to each other according to a great number of possibilites, by means of a very compact unit which is composed of the above-mentioned two or more plate-shaped conducting elements. Due to the fact that the plate-shaped conducting elements have a small thickness, a large number of them can be mounted one above the other, whereby rather complicated connections can also be realized. The invention is therefore particularly useful in places where many electrical wires must be installed, such as in offices, shop premises, warehouses, and so on.

The invention also aims at a distribution device which allows the making of electrical connections according to the method, which is moreover very convenient in application.

To this end the distribution device consists of a housing and two or more conducting elements, positioned in the housing, one above the other and mutually electrically insulated, which are provided with removable and bendable connection lips, which co-operate or can co-operate with the the connectors.

BRIEF DESCRIPTION OF THE DRAWINGS

In order to better show the characteristics of the invention, a preferred embodiment is described of the invention hereafter as an example, without any limitative character, with reference to the accompanying drawings in which:

FIG. 3 schematically represents the method according to the invention, in an embodiment in which use is made of conducting elements such as represented in FIGS. 1 and 2;

FIG. 9 represents a plan view of the bottom plate of the distribution device represented in FIG. 8;

FIGS. 10 and 11 represent sectional views according to lines X—X and XI—XI in FIG. 9;

FIG. 12 represents a bottom view of the cover of the distribution device of FIG. 8;

FIGS. 13 and 14 represent sectional views according to lines XIII—XIII and XIV—XIV in FIG. 12;

FIG. 15 represents a view such as in FIG. 12, in a partly assembled condition;

DESCRIPTION OF THE INVENTION

Figure 1:
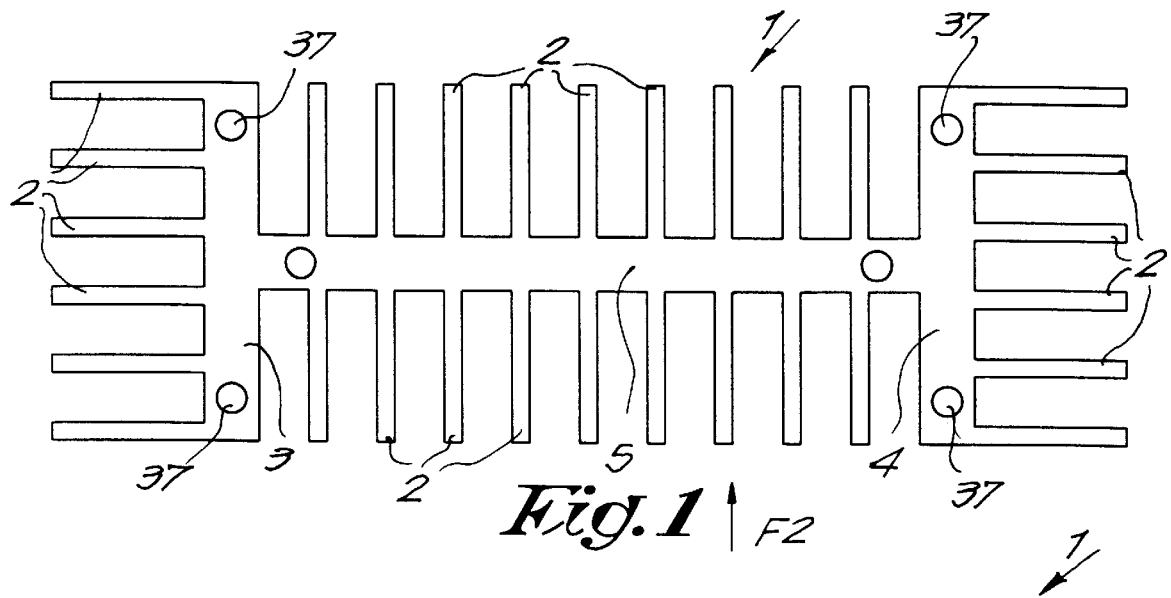
FIG. 1 represents a plan view of a conducting element of a distribution device according to the invention.
Figure 2:
FIG. 2 represents a view in a direction according to arrow F2 in FIG. 1.
Figures 4, 5:
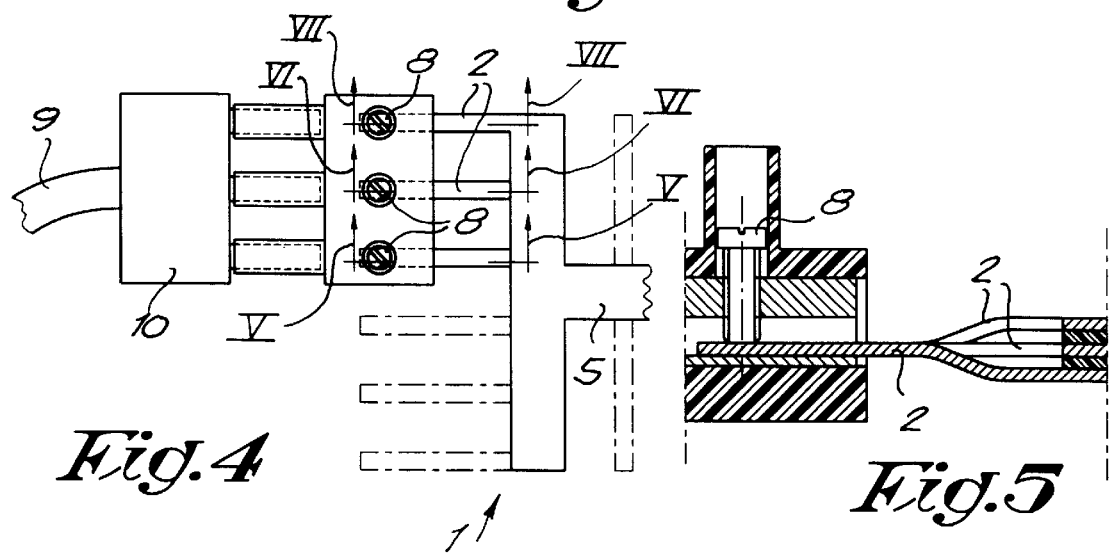
FIG. 4 represents a view in a direction according to arrow F4 in FIG. 3.
FIGS. 5, 6 and 7 represent sectional views according to lines V—V, VI—VI and VII—VII in FIG. 4.
Figure 6:
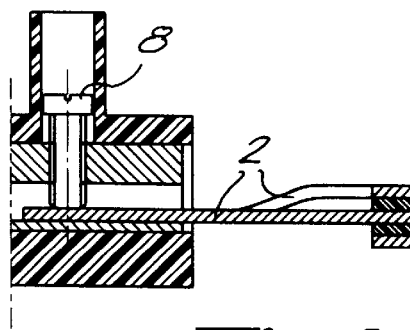
Figure 7:
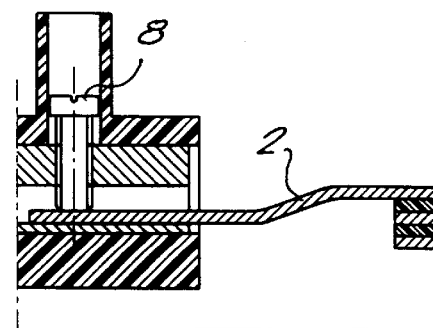

According to the invention and as represented in FIGS. 1 to 3, electrical connections are realized by means of plate-shaped conducting elements 1 which are provided with connection lips 2, whereby a number of these connection lips 2 can be removed depending on the connection which is to be realized, more specifically they can be cut off, while the remaining connection lips 2 can be bent.

The conducting elements 1, which are the main object of the invention, can hereby be of a different nature. Preferably they show a great number of connection lips 2 which extend in the four main directions.

More specifically, the conducting elements 1 show a basic H-shaped structure, whereby connection lips 2 are applied both perpendicularly on the outer faces of the side legs 3–4 and perpendicularly on the two opposite faces of the center leg 5.

A universal embodiment will be provided with a division of connection lips 2 such as represented in FIG. 1, more specifically on each side of legs 3, 4 are six connection lips 2 and on each side of the center leg 5 are nine connection lips 2.

Preferably the conducting elements 1 are made of a flat plate with a thickness of 0.2 to 2 millimeters, of a material with good electrical conductivity, for example copper or aluminium, which may be surface treated or not.

In order to realize the method according to the invention, several conducting elements 1 are made available, of which a number of connection lips 2 are cut off depending on the electrical connection which must be made. In FIG. 3 one starts from three conducting elements 1, whereby the connection lips 2, which are cut off, are represented in dotted lines such that the connection lips 2 of each conducting element 1 are disposed in respective substantially parallel planes.

The used conducting elements 1, which preferably show an identical basic structure, are positioned and placed one above the other, and are electrically insulated. The electrical insulation is hereby preferably realized by means of insulating plates 6 which are positioned between the conducting elements 1.

By assembling the conducting elements 1 and the insulating plates 6 into a packet, a compact unit is obtained.

Subsequently, according to the invention, and as schematically represented in FIG. 3, connectors 7 are placed on the connection lips 2 which have not been cut off.

To this end it is preferred to bend the connection lips 2, to be connected, of the conducting elements 1 situated at different levels, in such a way that the free ends thereof end up at the same level substantially parallel to the respective substantially parallel planes, which allows a connection to multipolar connectors.

The connection of the bent connection lips 2 to the connectors 7 is represented in detail in the FIGS. 4 to 7.

According to the invention, for bending, preferably use is made of a press, not shown in the drawing figures, which fits the packet of conducting elements 1 and the insulating plates 6, and which is realized in such a way that during pressing, each connection lip 2, which is not cut off, is bent into one and the same reference plane, which is preferably determined by a pressing plate joined to the press.

As also represented in FIGS. 3 to 7, preferably connectors 7 are used which can be mounted to the connection lips 2 by means of tension screws 8.

According to the invention preferably connectors 7 in the shape of plugs or counterplugs are used, in such a way that the electrical connection which is to be realized thereafter, can be simply done by plugging the ends of the wires 9 to be connected, by means of connectors 10, in the shape of plugs or counterplugs, into the connectors 7.

It is, however, evident that the invention is not limited to connectors 7 and 10 in the shape of plugs and counterplugs. For example, instead of the latter, use can as well be made of lustre terminals or other connector elements.

The invention also aims at a distribution device 11, more particularly a branch box, that enables realization of the method in a practical way.

Figure 8:
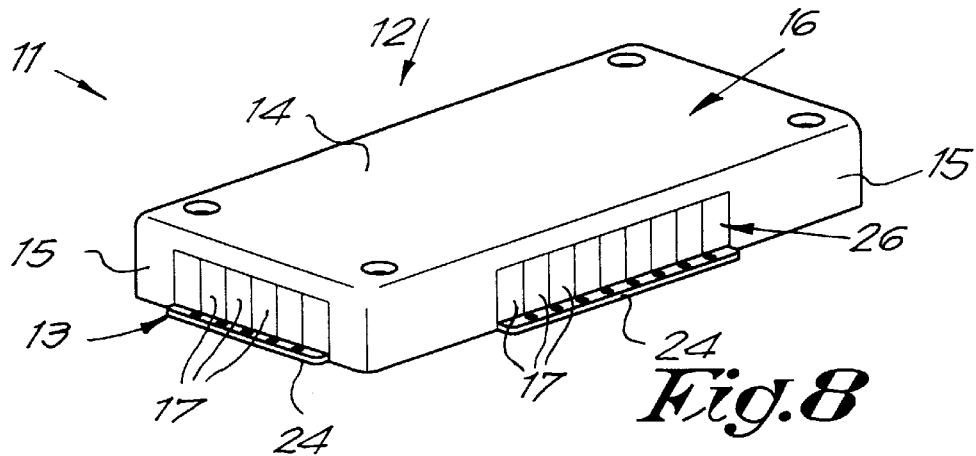
FIG. 8 represents a perspective view of a distribution device according to the invention.

To this end such distribution device 11, as represented in FIG. 8, is composed of a housing 12 in which the conducting elements 1 are or will be located.

Preferably the housing 12 such as represented in FIGS. 9 to 14 is composed of a bottom plate 13 and of a cover 16 formed by an upper face 14 and downwardly directed side walls 15, whereby in the side walls 15 removable portions 17 are provided to provide passages for the wires 9 and more particularly for the connectors 10.

The bottom plate 13 and the cover 16 are hereby provided with matching coupling parts 18–19, preferably pen- or box-shaped, which fit or snap together in such a way that the housing 12, after having been assembled, can only be opened by breaking it.

The housing 12 is, preferably at the four sides, provided with seats 20 for the connectors 7 and/or 10.

According to the invention the distribution device 11 is preferably also provided with different abutting elements and/or locking elements for the connectors 7 and/or 10, as described hereunder.

In order to keep the connectors 7 attached to the housing 12, protruding parts 21 are applied thereto which can co-operate with recesses at the bottom side of the connectors 7.

These protruding parts 21 are preferably located on the bottom plate 13 as represented in the figures.

Moreover, the bottom plate 13 is also provided with one or more abutting frames 22 against which the connectors 7 are seated.

It is also preferred to apply to the housing 12, more particularly to the cover 16, locking elements in the shape of frames 23, between which, or respectively behind which the connectors 7 become locked when assembling the unit.

To lock the connectors 10 after plugging, the bottom plate 13 is provided with one or more protruding parts 25, mounted on an elastically bendable part 24 thereof, which can co-operate with recesses applied in the bottom side of the connectors 10 being plugged in, whereby the bending of the elastically bendable parts 24 allows that the connectors 10 normally are locked, but can still also be unplugged at a given moment.

The housing 12 which, as said hereabove is multipartial, presents passages 26 for the connectors 7 and/or 10. These passages 26 are preferably applied in the side walls 15 of the cover 16. They can be closed by means of the removable portions 17. The passages 26 are preferably realized in such a way that the concerned connectors 7 and/or 10 are automatically kept in their seats when assembling the housing 12.

Moreover, the housing 12 can also be provided of different means to fix the latter to a wall or to other objects. In this embodiment the bottom plate 13 is to this end provided with openings 27, 28, in the bottom plate 13 and also in the cover 16 respectively for applying screws. Also, the bottom plate 13 is provided with bow-shaped parts 29, through which a strip or similar object can be put to allow the binding of the housing 12 to an object.

According to a special characteristic, the housing 12 is also provided with seats for applying intermediate separating elements with which the housing 12 can be divided in electrically separated compartments. In the represented embodiment those seats can be made by recesses 30,31 which are applied in frames 22,23.

As schematically represented in FIGS. 9 and 12, intermediate separating elements 32 can then be applied between the bottom plate 13 and the upper face 14 of the cover 16. Hereby it is an aim that in such case not only the concerned connection lips 2 are cut off, but that also the basic structure of the conducting elements 1 at the spot of the intermediate separating parts 32 is interrupted.

The use of similar intermediate separating parts 32 allows using the obtained compartments 33,34 for different purposes, for example to realize connections in a feeding network, on one hand, and to realize connections in a telephone network, on the other hand.

According to the invention, connectors 7 and 10 will preferably be used to show a different colour per network, in order to exclude a wrong connection.

In order to effectively position the conducting elements 1, and preferably also the insulating plates 6, the invention provides for the necessary centering means.

According to a practical embodiment these centering means are composed of elements, mutually connecting each other, which are applied to the respective conducting elements 1 and/or the insulating plates 6.

Figure 16:
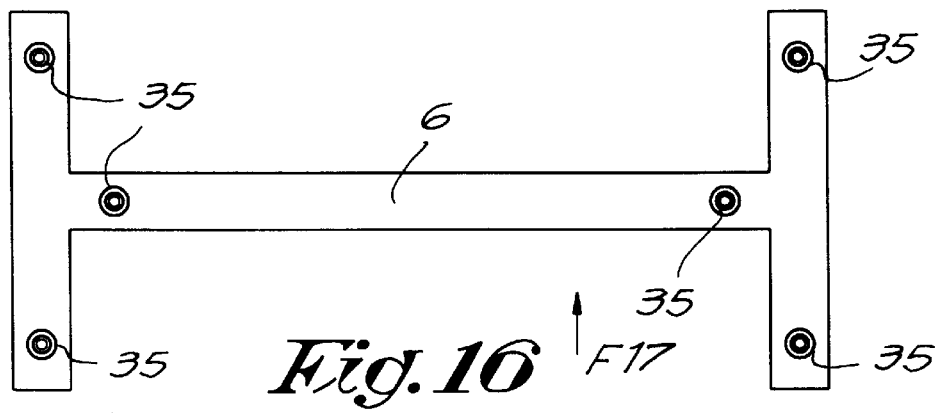
FIG. 16 represents a practical embodiment of an insulating plate, schematically represented in FIG. 3 as shown in the direction of arrow F16.
Figure 17:
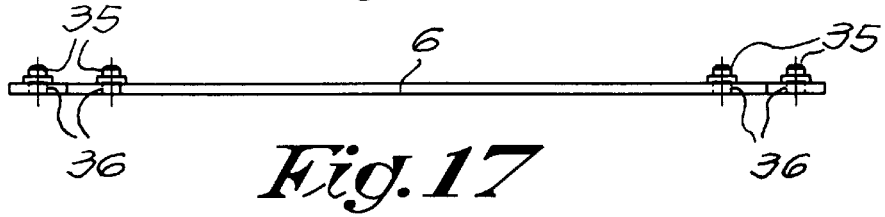
FIG. 17 represents a view in the direction according to arrow F17 in FIG. 16.

More particularly it is preferred that use is made of insulating plates 6 such as represented in FIGS. 16 and 17. Such insulating plates 6, which preferably consist of a self-extincting synthetic material, are provided with protruding parts 35 and corresponding seats 36, which are situated preferably and respectively at the upper side and the lower side. These protruding parts 35 are hereby realized in such a way that they fit in the openings 37 applied to the conducting elements 1, as well as in such a way that the protrusions 35 of an insulating plate 6, situated underneath, can be clampedly pressed into the seats 36 of an insulating plate 6 located thereabove.

When assembling the unit, the conducting elements 1 of concerned are placed one above the other with an insulating plate 6 underneath, between them and above, and the obtained packet is pressed together.

On this unit the required connectors 7 are fixed depending on the connections which must be realized.

It is to be noted that the insulating plates 6 preferably have the same shape as the basic structure of the conducting elements 1, in other words an H-shape, in such a way that they do not hinder the mounting of the connectors 7 on the connections lips 2.

Subsequently this unit is laid on the bottom plate 13. In the case of an electrical connection, such as represented in FIG. 3, a situation as represented in FIG. 18 is created.

Finally the cover 16 is mounted on the bottom plate 13, in this case simply by pressing. Evidently, the removable portions 17 which are situated at the spot of the used connectors 7, are removed.

Subsequently the wiring can be connected, simply by plugging the connectors 10 in the connectors 7.

Figure 18:
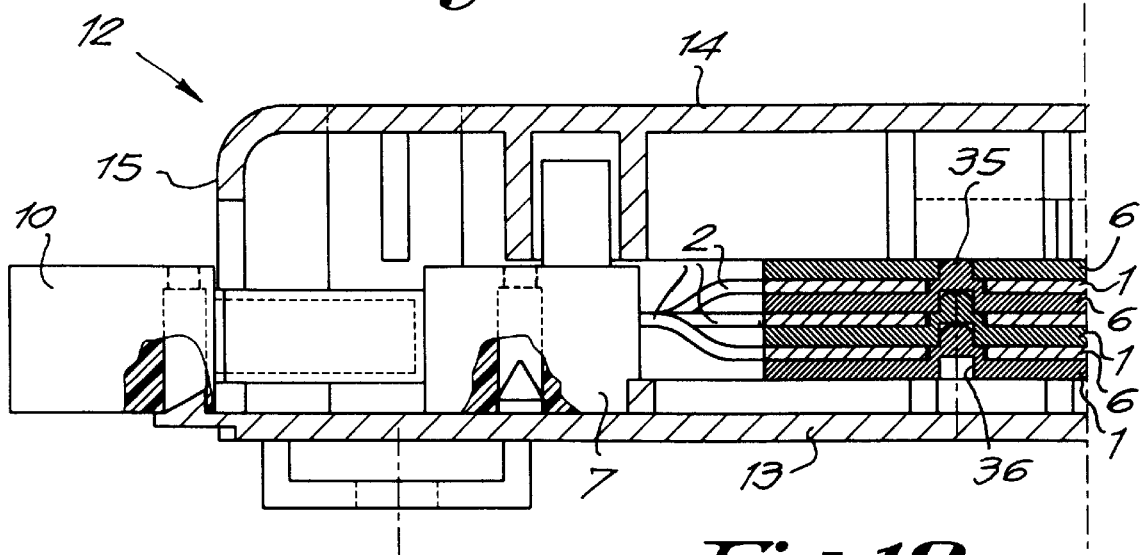
FIG. 18, represents in an enlarged scale, a sectional view according to line XVIII—XVIII in FIG. 15.

Hereby a situation is created as represented in FIG. 18. This figure shows how the connectors 7 and 10 are locked in the housing 12 by means of the abutting elements and locking elements.

FIG. 18 also represents how the protrusions 35 fit through the openings 37 and catch the seats 36.

It is clear that the distribution device 11 can be realized in different shapes. However, preferably use shall be made of a rectangular housing 12 which has plug-in possibilities at all four sides.

It is to be noted that in FIGS. 3 and 18, for clarity's sake, a connection is represented whereby only three poles are connected. It is evident that more complicated connections are possible, with several conducting elements 1.

The housing 12 can be realized of different heights in order to house more or less conducting elements 1.

The housing 12 is preferably made of shock-resistant and self-extincting synthetic material, with an elevated electrical insulating capacity.

The invention also concerns the elements which are used in the distribution device 11, and more particularly the conducting elements 1 described hereabove.

According to one variation one can start from a conducting element 1 whereby on each connection lip 2 a one-pole connector has been previously fixed, either a connector to fix a wire, or a connector in which a plug or counterplug can be connected, whereby the one-pole connector can then form one part with the accompanying connection lip 2. The connection lips which must be removed are then cut off together with the connectors fixed thereto.

For the connectors 7 and 10 use can be made of known embodiments, for example use of the device having the trade mark Wieland.

The present invention is in no way limited to the embodiment described by way of example and represented in the figures, but the method and the distribution device according to the invention can be realized in different variants without changing the scope of the invention.

We claim:

1. A method for making electrical connections comprising the steps of:
   (a) providing at least two conducting members each having a plurality of connection lips;
   (b) removing unwanted connection lips thereby leaving remaining connection lips;
   (c) providing said at least two conducting members one above the other in mutually insulated relationship such that said remaining connection lips of each conducting member are disposed in respective substantially parallel planes; and
   (d) providing at least some of said remaining connection lips with connectors to make said electrical connections.

2. A method according to claim 1, wherein said remaining connection lips are bent to be on the same level situated parallel to said respective parallel planes for each of said connectors.

3. A method according to claim 2, wherein said remaining connection lips are bent in a press in one pressing movement and pushed against a reference surface.

4. A method according to claim 1, wherein said connectors are connected to a second set of connectors, each of said second set of connectors being connected to wires.

5. A distribution device comprising:
   (a) a housing;
   (b) at least two conducting members disposed in said housing, each of said conducting member having a plurality of connection lips adapted to cooperate with one or more connectors, said connection lips being removable and bendable, said conducting members being disposed in said housing such that said connection lips are disposed in respective substantially parallel planes.

6. A distribution device according to claim 5, wherein said conducting members include plates; and electrically insulating plates electrically separating the conducting member plates.

7. A distribution device according to claim 5, wherein said conducting members have identical original configurations.

8. A distribution device according to claim 5, wherein said conducting members have a basic structure of an H-shape, said connection lips being disposed perpendicularly on outer faces of side legs of said H-shape, and said connection lips being disposed perpendicularly at opposite faces of a center leg of said H-shape.

9. A distribution device according to claim 5, wherein a centering structure is used to mutually center said conducting members.

10. A distribution device according to claim 9, wherein said centering structure includes protrusions on said electrically insulating paltes, said protrusions passing through openings in said conducting members to snap together successive, alternate insulation layers.

11. A distribution device according to claim 5, further comprising seats for one or more connectors.

12. A distribution device according to claim 5, wherein said at least one connector is provided in the shape of one of a plug or couterplug.

13. A distribution device according to claim 5, wherein said housing includes attachment members for locking connectors connected to said connection lips.

14. A distribution device according to claim 13, wherein said attaching members include at least one of first locking elements, said first locking elements having protrusions fixed to said housing to cooperate with recesses at a bottom side of said connectors; abutting elements being in a shape of frames against which said connectors rest; second locking elements with a second set of protrusions fixed to an elastically bendable part of said housing, said second set of protrusions cooperating with recesses in said bottom side of said connectors, said housing having an elastically bendable part to unplug said connectors; a plurality of passageways on said housing to attach and maintain said connectors in position in said housing; and third locking elements being frames fixed to said housing to lock said connectors during assembly.

15. A distribution device according to claim 5, wherein said housing includes a bottom plate and a cover having an upper face and side walls, said side walls being provided with removable sections to form passageways for said connectors.

16. A distribution device according to claim 15, wherein said bottom plate and said cover include coupling members to fasten together said bottom plate and said cover so that said housing can only be opened by breaking said housing.

17. A distribution device according to claim 5, wherein said housing includes seats for attaching intermediate separation members, said intermediate separation members dividing said housing into electrically separated compartments.

18. A conducting element comprising an H-shaped electrically conducting plate having a pair of side legs connected by a center leg, and a plurality of connection lips fixed perpendicularly at outer faces of the side legs and on opposite sides of the center leg.

19. A method according to claim 1, including providing a matching insulation layer between said at least two conducting members to provide said insulating relationship.

20. A method according to claim 2, wherein all said remaining connection lips are bent to be on the same level situated parallel to said respective parallel planes for each of said connectors.

* * * * *